United States Patent [19]

Ito et al.

[11] Patent Number: 5,395,520
[45] Date of Patent: Mar. 7, 1995

[54] FUEL FILTER CONTAINED IN A FUEL TANK

[75] Inventors: Koichi Ito, Ibaraki; Keiichi Yamashita; Yoshifumi Ina, both of Aichi, all of Japan

[73] Assignees: Kyosan Denki Co., Ltd., Tokyo; Nippondenso Co., Ltd., Aichi, both of Japan

[21] Appl. No.: 76,338

[22] Filed: Jun. 11, 1993

[30] Foreign Application Priority Data

Jun. 12, 1992 [JP] Japan ............... 4-177661

[51] Int. Cl.$^6$ ............................................ B01D 35/02
[52] U.S. Cl. .................................. 210/172; 210/315; 210/460; 210/499
[58] Field of Search ............... 210/172, 499, 460, 315, 210/416.4, 488, 489, 335

[56] References Cited

U.S. PATENT DOCUMENTS

| | | | |
|---|---|---|---|
| 1,304,918 | 5/1919 | Sweetland | 210/499 |
| 1,394,011 | 10/1921 | Hills | 210/172 |
| 2,490,443 | 12/1949 | Knipper | 210/460 |
| 2,788,125 | 4/1957 | Webb | 210/172 |
| 2,923,411 | 2/1960 | Oster | 210/172 |
| 3,067,504 | 12/1962 | Lubben et al. | 210/460 |
| 3,108,065 | 10/1963 | McMichael | 210/172 |
| 3,132,099 | 5/1964 | Eilhauer | 210/499 |
| 3,502,116 | 3/1970 | Crawford | 210/499 |
| 3,556,299 | 1/1971 | Zievers | 210/499 |
| 3,713,875 | 1/1973 | Beyer et al. | 210/499 |
| 3,826,372 | 7/1974 | Bell | 210/172 |
| 3,900,397 | 8/1975 | Bell | 210/172 |
| 4,304,664 | 12/1981 | McAlindon et al. | 210/172 |
| 4,358,372 | 11/1982 | Lundquist | 210/315 |
| 4,491,517 | 1/1985 | Janovac | 210/499 |
| 4,691,744 | 9/1987 | Haver et al. | 210/499 |
| 4,874,510 | 10/1989 | Akira et al. | 210/172 |
| 5,049,267 | 9/1991 | Sasaki et al. | 210/172 |
| 5,049,271 | 9/1991 | Cain | 210/460 |
| 5,055,187 | 10/1991 | Ito et al. | 210/172 |
| 5,084,166 | 1/1992 | Shiraga et al. | 210/172 |
| 5,120,434 | 6/1992 | Yoshida | 210/172 |

FOREIGN PATENT DOCUMENTS

| | | |
|---|---|---|
| 60-119907 | 8/1985 | Japan . |
| 62-179387 | 11/1987 | Japan . |
| 63-235659 | 9/1988 | Japan . |
| 63-181408 | 11/1988 | Japan . |

*Primary Examiner*—Cynthia L. Nessler
*Attorney, Agent, or Firm*—Flynn, Thiel, Boutell & Tanis

[57] ABSTRACT

A fuel filter contained in a fuel tank improves fuel permeability without deteriorating foreign matter catching ability. Filter cloths of the fuel filter is of a double structure wherein an outer (or inner) filter is of a plain weave, while an inner (or outer) filter is of a tatami-facing like weave.

14 Claims, 4 Drawing Sheets

FUEL FILTER CONTAINED IN A FUEL TANK

BACKGROUND OF THE INVENTION

1. Technical Field:

The present invention relates to an improvement of a fuel filter contained in a fuel tank, more particularly to a fuel filter contained in a fuel tank which is improved in permeability without deteriorating its foreign matter catching ability.

2. Prior Art:

There are various kinds of fuel filters for catching foreign matters in fuel, of which the fuel filter provided in a fuel tank in such a way as to be soaked in fuel is known.

Japanese Utility Model Laid-Open Publication No. 62-179387 and No. 63-181408 disclose a double filter cloth.

Japanese Utility Model Laid-Open Publication No. 62-179387 also discloses the filter cloth either side of which is formed of a mesh having high wettability and further discloses a fuel suction pipe 15 formed of a mesh of high wettability and a mesh portion 14 provided outside the fuel suction pipe 15 in FIG. 1. Since the fuel suction pipe 15 is formed of the mesh having high wettability, fuel is sucked thereby with certainty even if the liquid level is lowered.

Japanese Utility Model Laid-Open Publication No. 63-181408 also discloses a mechanism having a main nylon filter 38 and an auxiliary stainless filter 46 wherein a large gap is defined between the main filter 38 positioned inside and the auxiliary filter 46 positioned outside.

The known fuel tank contained in a fuel tank has a structure as illustrated in FIGS. 4 and 5. That is, a fuel filter 1 is composed of a filter cloth 2, a frame body 4 for supporting the filter cloth 2 so as to partition and form inner spaces 3 thereof and an outlet pipe portion 5 for discharging the fuel.

The filter cloth 2 used for the fuel filter 1 contained in a fuel tank is required to have the following functions.

Firstly, the mesh size of the filter cloth 2 should be small and accurately fixed so as to catch foreign matters since the primary purpose of the fuel filter 1 is to catch the foreign matters in the fuel. It ranges practically from 100 μm to 60 μm since too small meshes cause filter obstruction.

Secondly, even when the fuel in the fuel tank is at so low level that a part of the filter cloth 2 is exposed above the surface of the fuel and contacts air, air does not pass through the part of the filter cloth 2 contacting the air but fuel alone passes through the same part. For this purpose, the filter cloth 2 should always contain the fuel (in a wet state) at the portion which contacts the air. That is, air can not pass through the part of the filter cloth 2 even if the latter contacts the former at a part of the latter since the passing resistance of air which passes the filter cloth 2 which is moistened with fuel is larger than that of fuel which passes the part of the filter cloth 2 which is soaked in the fuel. In order to always keep the filter cloth 2 wet, the filter cloth 2 should have a structure which is excellent in permeability and should be composed of material which is excellent in permeability, and moreover it should have a structure and a shape which are favorable for capillarity since the permeation of fuel occurs due to capillarity.

As described above, the filter cloth 2 of the fuel filter 1 should be designed considering both of the foreign matter catching ability and the fuel permeability.

On the other hand, the weaving methods of the filter cloth 2 of the fuel filter 1 can be roughly classified into two, i.e., a plain weave as illustrated in FIG. 6 and a tatami-facing-like weave as illustrated in FIG. 7.

Referring to FIG. 6, the plain weave is formed by weaving a warp yarn 5 and a weft yarn 6 alternately one by one at regular intervals H so as to form square meshes M therebetween.

Referring to FIG. 7, the tatami-facing-like weave is formed by linearly putting weft yarns 6 at regular intervals H and alternately weaving the warp yarns 5 into the weft yarns 6 without any interval between the warp yarns 5 (which contact each other) so as to not to form the mesh. (Although no mesh is seen in a plan view, there are gaps between the vertically waving warp yarns 5 and the weft yarns 6, the gaps substantially serving as meshes M.

There are twill weave, sateen weave, etc. which are similar in structure to the plain weave. The twill weave is formed by weaving a pair of warp yarns and a pair of weft yarns alternately at regular intervals so as to form square meshes therebetween, while the sateen weave is formed by weaving the pairs of warp and weft yarns at regular intervals so as to form meshes therebetween, in which a yarn is staggered at an interval of four yarns. Both of these twill weave and sateen weave can be considered to have structures similar to that of the plain weave from the viewpoint of permeability. The plain weave, the twill weave, the sateen weave, etc. will be generally called hereinafter as a plain weave etc.

Filter cloths of tatami-facing-like weave are not in general use recently since the mesh size M can hardly be made fixed and is difficult to be made less than 100 μm.

On the other hand, filter cloths 2 of the plain weave etc. are in general use recently since the mesh size M thereof can be easily made fixed.

The filter cloth 2 of the plain weave etc. in the known fuel filter 1 set forth above, however, has the following problems.

The filter cloth 2 of the plain weave etc. is liable to be insufficient in the capillary permeation of fuel, so that the permeability is lowered to thereby permit the air to pass therethrough.

As described above, although the filter cloth of the tatami-facing-like weave which is excellent in fuel permeability can avoid this trouble, the mesh size M thereof is hardly fixed and moreover it is difficult to range from 100 μm to 60 μm.

Accordingly, it is an object of the present invention to improve the problems of the conventionally known fuel filter contained in a fuel tank and provide a fuel filter contained in a fuel tank having a filter cloth which is improved in the permeability of fuel without deteriorating the foreign matter catching ability.

SUMMARY OF THE INVENTION

In order to attain the above object, the fuel filter according to the present invention is characterized in having a double structure of the inner and outer filter cloths, the inner of which cloth is composed of a filter cloth of plain weave etc. which is excellent in foreign matter catching ability and the outer of which cloth is composed of a filter cloth of tatami-facing-like weave which is excellent in fuel permeability.

With the structure set forth above, a gap is defined between the inner and outer filter cloths, through which fuel permeates the fuel filter. As a result, the fuel filter is kept wet with certainty and even if a part of the fuel filter is exposed to the air, the air does not pass therethrough. Moreover, the fuel filter having the double structure of the inner and outer filter cloths, the inner of which cloths is of the plain weave etc. which is excellent in foreign matter catching ability and the outer of which cloths is of the tatami-facing-like weave which is excellent in fuel permeability, can obtain both effects of improving the fuel permeability and improving the foreign matter catching ability.

PREFERRED EMBODIMENT OF THE INVENTION

A preferred embodiment of the present invention will be described hereinafter with reference to drawings.

Figure 1:
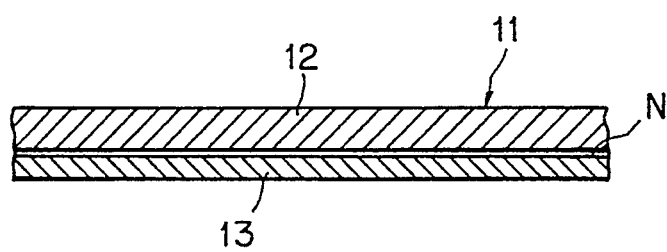
FIG. 1 is a substantially cross-sectional view of a double filter cloth of a fuel filter according to a preferred embodiment of the present invention.
Figure 2:
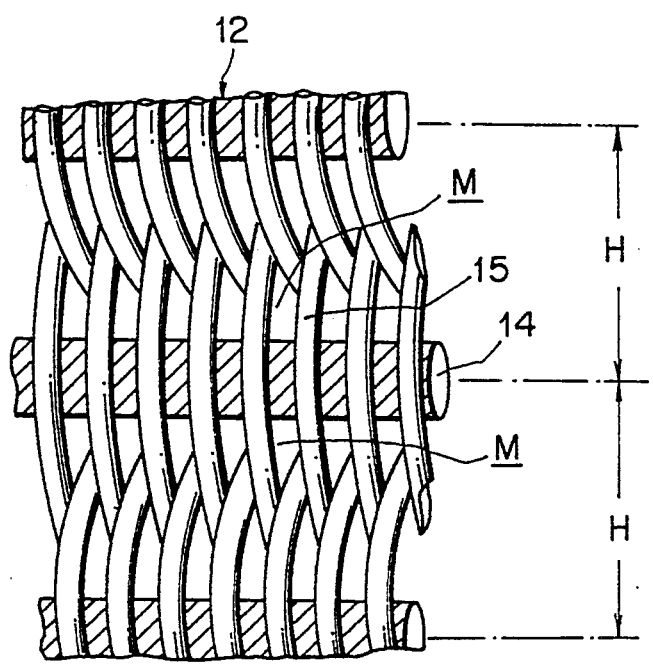
FIG. 2 is a perspective view of the outer filter cloth in FIG. 1.
Figure 3:
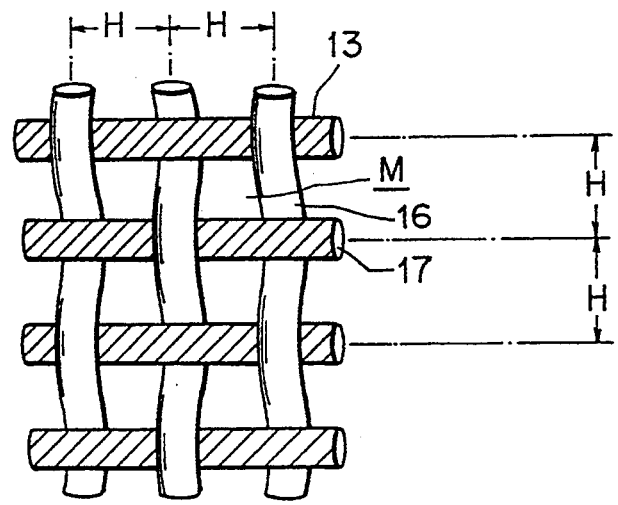
FIG. 3 is a perspective view of the inner filter cloth in FIG. 1.
Figure 4:
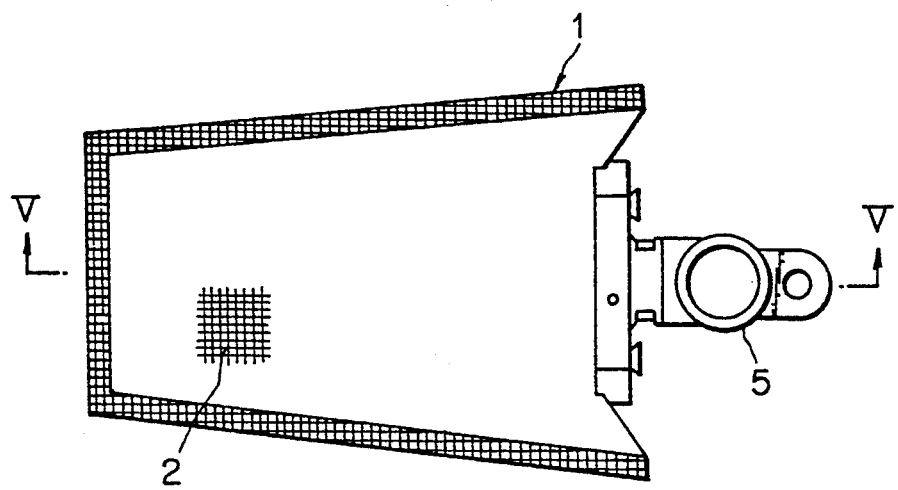
FIG. 4 is a plan view showing a conventional known fuel filter contained in a fuel tank.
Figure 5:
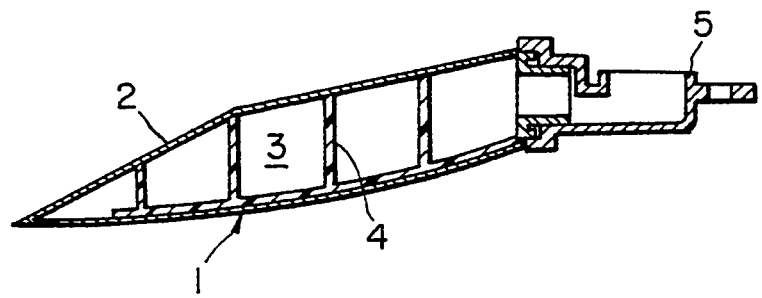
FIG. 5 is a cross-sectional view of FIG. 4 taken along V—V line.
Figure 6:
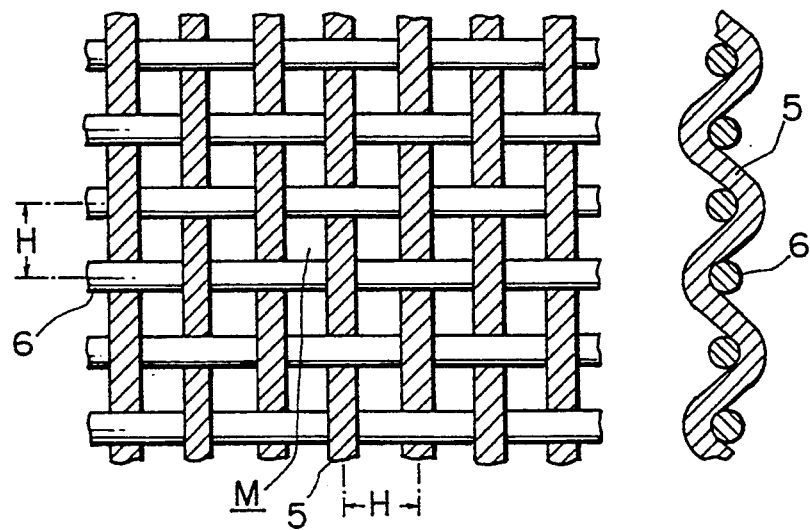
FIG. 6 is a plan view exemplifying a part of the conventional filter cloth of plain weave.
Figure 7:
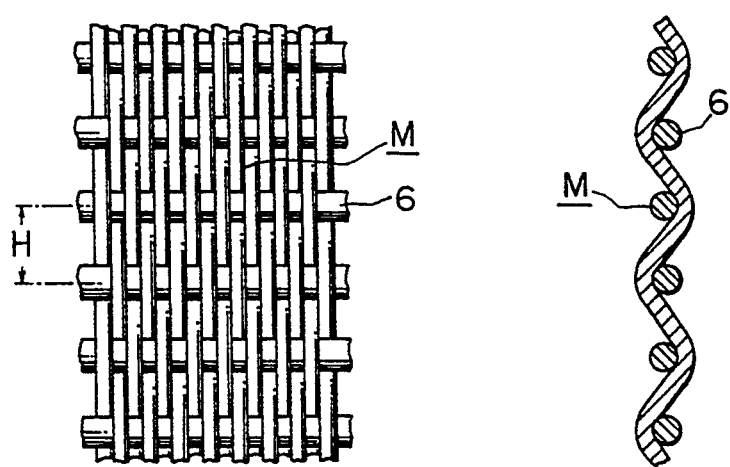
FIG. 7 is a plan view exemplifying a part of the conventional filter cloth of tatami-facing-like weave.

FIGS. 1 to 3 show filter cloths used in fuel filters contained in fuel tanks as illustrated in FIGS. 4 and 5, wherein FIG. 1 is a cross-sectional view showing a part of the filter cloth according to the embodiment of the present invention, FIG. 2 is a perspective view of an outer filter cloth in FIG. 1 and FIG. 3 is a perspective view of an inner filter cloth in FIG. 1.

Figure 8:
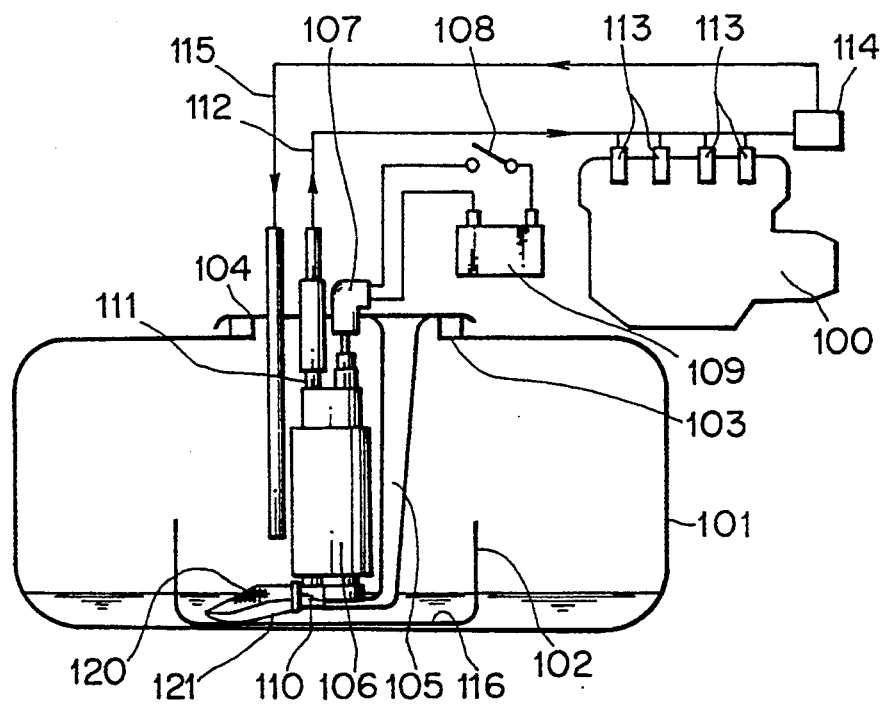
FIG. 8 is a view showing a structure of a fuel supply device for a car to which an embodiment of the present invention is applied.

FIG. 8 is a view showing a structure of a fuel supply device for a car to which an embodiment of the present invention is applied. Fuel is supplied to an engine 100 for running the car from a fuel tank 101. A sub-tank 102 is fixed to the bottom surface of the fuel tank 101. A cover 104 is provided at the opening 103 of the fuel tank 101. A bracket 105 is hung down toward the inside of the fuel tank 101. A fuel pump 106 is supported by the bracket 105. Power is supplied to the fuel pump 106 from a battery 109 mounted on the car by way of a connector 107 and a power source switch 108. A fuel filter 120 contained in the fuel tank 101 according to the embodiment is provided at an suction inlet 110 of the fuel pump 106. The fuel discharged from an outlet 111 of the fuel pump 106 is supplied to a fuel injection valve 113 by way of a pipe 112 and is injected into a suction pipe of the engine from the fuel injection valve 113. A pressure regulator 114 is provided at the end of the pipe 112. The pressure regulator 114 keeps fuel pressure inside the pipe 112 constant by discharging pressurized fuel in the pipe 112 to a return pipe 115.

The fuel filter 120 extends to the bottom surface 116 of the sub-tank 102 which forms substantially the bottom surface of the fuel tank 101 for removing foreign matters as it filters fuel which is sucked by the fuel pump 106 wherein the lower surface 121 of the fuel filter 120 contacts the bottom surface 116 of the sub-tank 102.

Referring back to FIG. 1, a filter cloth 11 according to the present invention has a double structure of an outer filter cloth 12 and an inner filter cloth 13, wherein the outer filter cloth 12 is made of a filter cloth of tatami-facing-like weave while the inner filter cloth 13 is made of a filter cloth of plain weave etc.

In FIG. 2, the outer filter cloth 12 is manufactured by placing weft yarns 14 having a larger diameter at regular intervals H and weaving warp yarns 15 having a smaller diameter into the weft yarns 14, wherein the warp yarns 15 are arranged in contact with each other. As a result, each of the meshes M thereof is defined by the portion surrounded by the weft yarns 14 and adjacent warp yarns 15 (a gap extending in the direction of thickness of the filter cloth), which is hidden in a plan view.

In FIG. 3, the inner filter cloth 13 is manufactured by placing warp yarns 16 and weft yarns 17 both of which are equal to each other in diameter at regular intervals H and weaving the warp yarns 16 and the weft yarns 17 alternately. As a result, each of the meshes M forms a square which is defined by the warp yarns 16 and the weft yarns 17 and is visible in a plan view. The meshes M regulate the passing of foreign matters.

Figure 9:
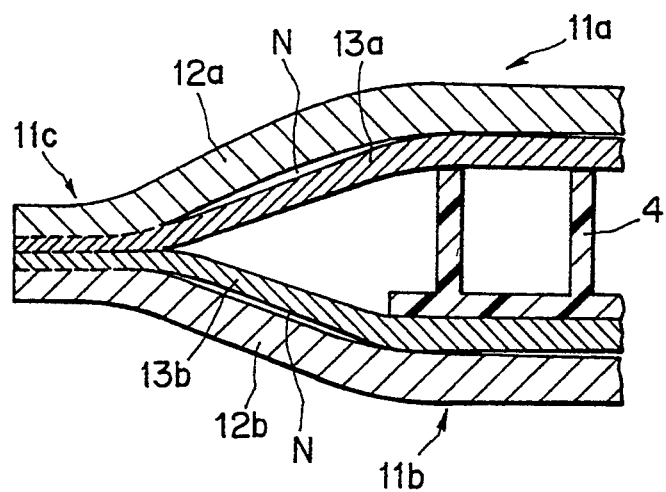
FIG. 9 is a cross-sectional view of a welding portion of the fuel filter.

FIG. 9 is a cross-sectional view of a welding portion 11c of the fuel filter 120. The fuel filter 120 comprises an upper filter cloth 11a and a lower filter cloth 11b which overlap each other and the periphery thereof is welded at the three sides thereof so as to form a baggy fuel filter. The suction inlet 110 of the fuel pump 106 is connected to the inner space of the baggy fuel filter 120. The upper filter cloth 11a is a double filter cloth comprising an outer filter cloth 12a of tatami-facing like weave etc. and an inner filter cloth 13a of plain weave, etc. which directly overlap each other so as to contact each other while the lower filter cloth 11b is of a double filter cloth comprising an outer filter cloth 12b of tatami-facing like weave etc. and an inner filter cloth 13b of plain weave, etc. which directly overlap each other so as to contact each other. The upper filter cloth 11a and the lower filter cloth 11b overlap each other and are welded to each other while the filter cloths 13a and 13b of plain weave, etc. are positioned inside the baggy fuel filter 120. Accordingly, the filter cloth of the fuel filter 120 comprises the filter cloth 12a of tatami-facing like weave, the filter cloth 13a of plain weave, etc., the filter cloth 13b of plain weave, etc. and the filter cloth 12b of tatami-facing like weave which overlap one another in this order in the cross-section thereof wherein an inner space defined between the inner filter cloths 13a and 13b of plain weave, etc. forms a fuel passage after the fuel is filtered.

When the filter cloths 12a and 12b of tatami-facing like weave are welded to each other while they are positioned outside, the filter cloths 13a and 13b of plain weave, etc. formed of relatively fine fibers are positioned inside so that the upper and lower filter cloths 11a and 11b are welded to each other with assurance.

When the filter cloths 12a and 12b of tatami-facing like weave are positioned outside the filter cloths 13a and 13b of plain weave, etc. , the fuel filter can obtain relatively high abrasion resistance. Even if the fuel filter 120 contacts the bottom surface of the fuel tank 101, the filter cloth is prevented from being torn.

The above mentioned filter cloth of tatami-facing-like weave means a filter cloth which is manufactured by alternately weaving warp yarns contacting each other into weft yarns arranged at regular intervals, and the filter cloth of the present invention is not limited to the filter cloth of tatami-facing-like weave employed by the present embodiment.

For example, the relation between the warp yarn and the weft yarn in thickness is not limited to that of the above embodiment, i.e., narrow warp yarns and thick weft yarns. The weft yarns may be equal to the warp yarns in thickness, and moreover, the warp yarns may be thick and the weft yarns may be narrow. Furthermore, the weft yarns need not be always linear, but may be vertically in zigzags relative to the surface of paper showing FIG. 2.

The function of catching foreign matters and the permeation of fuel of the filter cloth 11 of the fuel filter contained in a fuel tank according to the present invention having the structure set forth above will be described hereinafter.

At first fuel passes the meshes M of the outer filter cloth 12. At that time, the small foreign matters in the fuel also pass the outer filter cloth 12 since the mesh size M is large. When the fuel reaches the inner filter cloth 13, the inner filter cloth 13 catches the foreign matters so that the fuel alone is fed toward the inside of the inner filter cloth 13.

The inner filter cloth 13 is composed of a filter cloth of plain weave etc., which is fixed and can be small in mesh size (ranging from 100 $\mu$m to 60 $\mu$m). As a result, the inner filter cloth 13 can remove foreign matters sufficiently.

The permeation of fuel will be described hereinafter. The fuel is kept in a minute gap N defined by the outer filter cloth 12 and the inner filter cloth 13 where the former contacts the latter and permeates the filter cloths 12 and 13 due to capillarity. Consequently, when a part of the filter cloth 11 of the fuel filter is soaked in fuel, the fuel permeates the whole filter cloth 11 so that the whole filter cloth 11 becomes wet. Since the outer filter cloth 12 is of tatami-facing-like weave according to the present embodiment, even the outer filter cloth 12 alone can cause the permeation of fuel due to capillarity. Accordingly, the permeation of fuel caused by the outer filter cloth 12 per se and the permeation of fuel due to the capillarity generated in the minute gap N between the two filter cloths involve the higher permeability of fuel.

The present invention is not limited to the embodiment set forth above but modified as follows.

For example, the filter cloth of plain weave, etc. for regulating the capture of foreign matters need not be provided on the inside of the fuel filter, but may be provided on either side thereof. Even with such arrangement, it is also possible to obtain the higher permeability of fuel due to capillarity generated in one of the filter cloths and capillarity generated in a minute gap N between the two filter cloths which work conjointly with each other when the inner filter cloth is woven in such a way as to be liable to generate capillarity therein such as tatami-facing-like weave.

Furthermore, the fuel filter is formed of baggy by welding the filter cloth at one end thereof. If the fuel filter is formed of the double filter cloth comprising the outer filter cloths of plain weave, etc. and the inner filter cloths of tatami-facing like weave, they are overlapped and welded to one another in the descending order of the filter cloth of plain weave, etc. the filter cloth of tatami-facing like weave, the filter cloth of tatami-facing like weave and the filter cloth of plain weave, etc. which is likely to render the welding between the inner filter cloths of tatami-facing like weave insufficient. Accordingly, if the fuel filter is formed of the inner and outer double filter s comprising the filter cloths of plain weave etc. and tatami-facing like weave, it is preferable that the outer filter cloth is of the tatami-facing like weave and the inner filter cloth is of the plain weave, etc.

If both the filter cloths of the double filter cloth are of the plain weave, either of which assures the foreign matter catching ability while the rest of which is formed of a double structure so as to improve the fuel permeability. That is, if the fuel filter is formed of the inner and outer double filter cloths, minute gaps are defined between the portions where the inner and outer filter cloths contact each other through which gaps fuel permeates the filter cloths due to capillarity. In this case, the mesh size of one of the inner and outer filter cloths is larger than that through which the foreign matters is caught while the mesh sizes of both the inner and outer filter cloths are not substantially less that those through which the fuel passes when both the inner and outer filter cloths overlap each other so that the mesh sizes thereof interfere with one another.

With the arrangement of the present invention, since the fuel permeability is improved at the surface of the fuel filter, the fuel permeability can be compatible with the foreign matter catching ability without deteriorating the foreign matter catching ability. Furthermore, the fuel filter can prevent entrance and suction of air while assuring the suction of the foreign matters.

If the inner cloth is of the plain weave, etc. which removes the foreign matters and the outer filter cloth is of the tatami-facing like weave which is excellent in fuel permeability, it is possible to attain both the high fuel permeability and the efficient foreign matter catching ability.

Still furthermore, if the inner filter cloth is of the plain weave, etc. and the outer filter cloth is of the tatami-facing like weave, it is possible to improve the efficiency of the welding operation when the fuel filter is formed baggy and improving the quality of the fuel filter by assuring the welding.

What is claimed is:

1. In a fuel filter provided in a fuel tank for filtering fuel which is sucked by a fuel pump, said fuel filter comprising:
    an inner filter cloth formed of plain woven filter cloth for removing foreign matter in the fuel;
    an outer filter cloth formed of tatami-type woven filter cloth of high fuel permeability, said outer filter cloth being overlapped with said inner filter cloth so as to contact one another; and
    frame means for providing an inner space closed by said inner and outer filter cloths so that said fuel pump sucks a filtered fuel in said inner space;
    wherein said outer fiber cloth contacts the bottom surface of said fuel tank.

2. A fuel filter according to claim 1, further comprising a passage which penetrates said inner and outer filter cloths and extends from said inner space to said fuel pump.

3. A fuel filter according to claim 1, wherein said inner filter cloth is welded at three sides of the outer periphery thereof.

4. A fuel filter according to claim 3, wherein said outer filter-cloth is welded at three sides of the outer periphery thereof.

5. A fuel filter according to claim 4, wherein three sides of the outer periphery of said inner filter cloth and three sides of said outer filter cloth are welded at the same time.

6. A fuel filter according to claim 1, wherein the thickness of yarn constituting said inner filter cloth is smaller than the thickness of yarn constituting said outer filter cloth.

7. A fuel filter according to claim 1, wherein the mesh size of said inner filter cloth is smaller than that of said outer filter cloth.

8. In a fuel filter provided in a fuel tank and mounted on a suction port of a fuel pump for sucking fuel in said fuel tank from said suction port, said fuel filter filtering fuel which is sucked by said fuel pump and supplying said fuel to an internal combustion engine, said fuel filter comprising;
   an inner filter cloth formed of plain woven filter cloth for removing foreign matter in the fuel;
   an outer filter cloth formed of tatami-type woven filter cloth of high fuel permeability, said outer filter cloth being overlapped with said inner filter cloth so as to contact one another; and
   frame means for providing an inner space closed by said inner and outer filter cloths so that said fuel pump sucks a filtered fuel in said inner space;
   wherein said outer fiber cloth contacts the bottom surface of said fuel tank.

9. A fuel filter according to claim 8, further comprising a passage which penetrates said inner and outer cloths and extends from said inner space to said fuel pump.

10. A fuel filter according to claim 8, wherein said inner filter cloth is welded at three sides of the outer periphery thereof.

11. A fuel filter according to claim 10, wherein said outer filter cloth is welded at three sides of the outer periphery thereof.

12. A fuel filter according to claim 11, wherein three sides of the outer periphery of said inner filter cloth and three sides of said outer filter cloth are welded at the same time.

13. A fuel filter according to claim 8, wherein the thickness of yarn constituting said inner filter cloth is smaller than the thickness of yarn constituting said outer filter cloth.

14. A fuel filter according to claim 8, wherein the mesh size of said inner filter cloth is smaller than that of said outer filter cloth.

* * * * *